(12) United States Patent
Pallapa et al.

(10) Patent No.: US 10,708,315 B1
(45) Date of Patent: Jul. 7, 2020

(54) CONFERENCE CALL DIRECT ACCESS

(71) Applicant: West Corporation, Omaha, NE (US)

(72) Inventors: Gautham Pallapa, Omaha, NE (US);
Santhosh Shetty, Omaha, NE (US);
Karen Sue White, Omaha, NE (US);
Mohammed Qurashi, Omaha, NE (US)

(73) Assignee: West Corporation, Omaha, NE (US)

( * ) Notice: Subject to any disclaimer, the term of this patent is extended or adjusted under 35 U.S.C. 154(b) by 71 days.

(21) Appl. No.: 15/964,363

(22) Filed: Apr. 27, 2018

(51) Int. Cl.
*H04M 3/42* (2006.01)
*H04L 29/06* (2006.01)
*H04L 29/08* (2006.01)

(52) U.S. Cl.
CPC ......... *H04L 65/1069* (2013.01); *H04L 63/08* (2013.01); *H04L 65/1093* (2013.01); *H04L 67/306* (2013.01); *H04L 65/403* (2013.01)

(58) Field of Classification Search
CPC .... H04L 65/1069; H04L 63/08; H04L 65/403
USPC .............................. 379/202.01, 158
See application file for complete search history.

(56) References Cited

U.S. PATENT DOCUMENTS

| | | | | |
|---|---|---|---|---|
| 6,304,648 B1 * | 10/2001 | Chang | ................... | H04M 3/567 348/14.08 |
| 6,792,093 B2 * | 9/2004 | Barak | ................... | H04M 1/656 379/202.01 |
| 6,976,055 B1 * | 12/2005 | Shaffer | ............. | H04L 29/06027 348/14.09 |
| 7,308,090 B2 * | 12/2007 | White | ............... | H04M 3/42382 379/202.01 |
| 9,736,165 B2 * | 8/2017 | Malik | ................... | H04W 12/06 |
| 2002/0159490 A1 * | 10/2002 | Karwacki | ........... | H01S 5/18341 372/50.11 |
| 2006/0250987 A1 * | 11/2006 | White | ............... | H04M 3/42382 370/260 |
| 2010/0216211 A1 * | 8/2010 | Shauer | .................... | A61L 27/20 435/183 |
| 2013/0162752 A1 * | 6/2013 | Herz | ........................ | H04N 7/15 348/14.08 |
| 2013/0239024 A1 * | 9/2013 | Lewis | .................... | H04N 7/147 715/756 |
| 2017/0046315 A1 * | 2/2017 | Chitta | ................... | H04L 65/403 |
| 2018/0007060 A1 * | 1/2018 | Leblang | ................ | H04L 63/105 |
| 2019/0174095 A1 * | 6/2019 | Rosenberg | ............... | H04N 7/15 |
| 2019/0295041 A1 * | 9/2019 | Sim | .................... | G06Q 10/1095 |

\* cited by examiner

*Primary Examiner* — William J Deane, Jr.

(57) ABSTRACT

Processing conference call communications may include receiving a request from a customer device to access the conference. One example method of operation may include receiving a conference call access request message from a user device, identifying an identifier included in the access request message associated with the user device, comparing content of the identifier to known identifier information, determining whether to authorize the access request, and responsive to authorizing the access request, transmitting a prompt to the user device to access the conference call.

31 Claims, 8 Drawing Sheets

US 10,708,315 B1

CONFERENCE CALL DIRECT ACCESS

TECHNICAL FIELD OF THE APPLICATION

This application relates to a conference call bridging function and more specifically to establishing a conference call based on a direct access option without requiring multiple data input operations.

BACKGROUND OF THE APPLICATION

Conventionally, when a conference call is scheduled, a scheduled conference date may be set, and other information may be recorded in the form of an electronic calendar or other application used to manage the conference call. Also, the majority of conference call bridge services include software interfaces which provide email or SMS access to a user's mobile phone. Those services may be relatively convenient and organized, however, the number of work-at-home individuals and on-the-go personnel continues to rise each year and requires increased flexibility when accessing conference calls. Finding an email, an application, a conference dial-in number, a conference code and sometimes even a pin number for the administrator or group leader requires time, effort and additional organization prior to accessing the conference call.

In a conventional prior art configuration 100 of FIG. 1, the user device 210 may attempt to access a conference bridge device 220 via a communication network to receive access to a conference. The conference data 240 may be known and established prior to the conference and may also be referenced when attempting to cross-reference credentials of the user device, to identify a user device, account information, etc. However, the access attempts are generally based on the information received by the conference bridge 220 and not on known information. For example, the process normally includes multiple data input operations including, but not limited to dialing a conference number 212, being prompted at the user device to enter a specific conference code 214, providing the conference code 216 to the server, prompting the user device for a conference leader pin 218 and providing the conference leader pin to the bridge 220, if necessary. Then, once all required information is received via input on the user device 210, the conference call may be connected to link user device to the other participants 250.

The multiple data input operations and information make the conference call a burden for any participant desiring to have quick and easy access. However, conferences often include divulgence of sensitive information and undesired guests must be kept from accessing the conference.

SUMMARY OF THE APPLICATION

Example embodiments of the present application provide at least a method that includes at least one of receiving a conference call access request message from a user device, identifying an identifier included in the access request message associated with the user device, comparing content of the identifier to known identifier information, determining whether to authorize the access request, and responsive to authorizing the access request, transmitting a prompt to the user device to access the conference call.

Another example embodiment may include an apparatus that includes a receiver configured to receive a conference call access request message from a user device, a processor configured to identify an identifier included in the access request message associated with the user device, compare content of the identifier to known identifier information, determine whether to authorize the access request, and a transmitter, which responsive to authorization of the access request, transmits a conference access prompt to the user device to access the conference call.

Another example embodiment may include a non-transitory computer readable storage medium configured to store instructions that when executed cause a processor to perform at least one of receiving a conference call access request message from a user device, identifying an identifier included in the access request message associated with the user device, comparing content of the identifier to known identifier information, determining whether to authorize the access request, and responsive to authorizing the access request, transmitting a conference access prompt to the user device to access the conference call.

DETAILED DESCRIPTION OF THE APPLICATION

Figure 1:
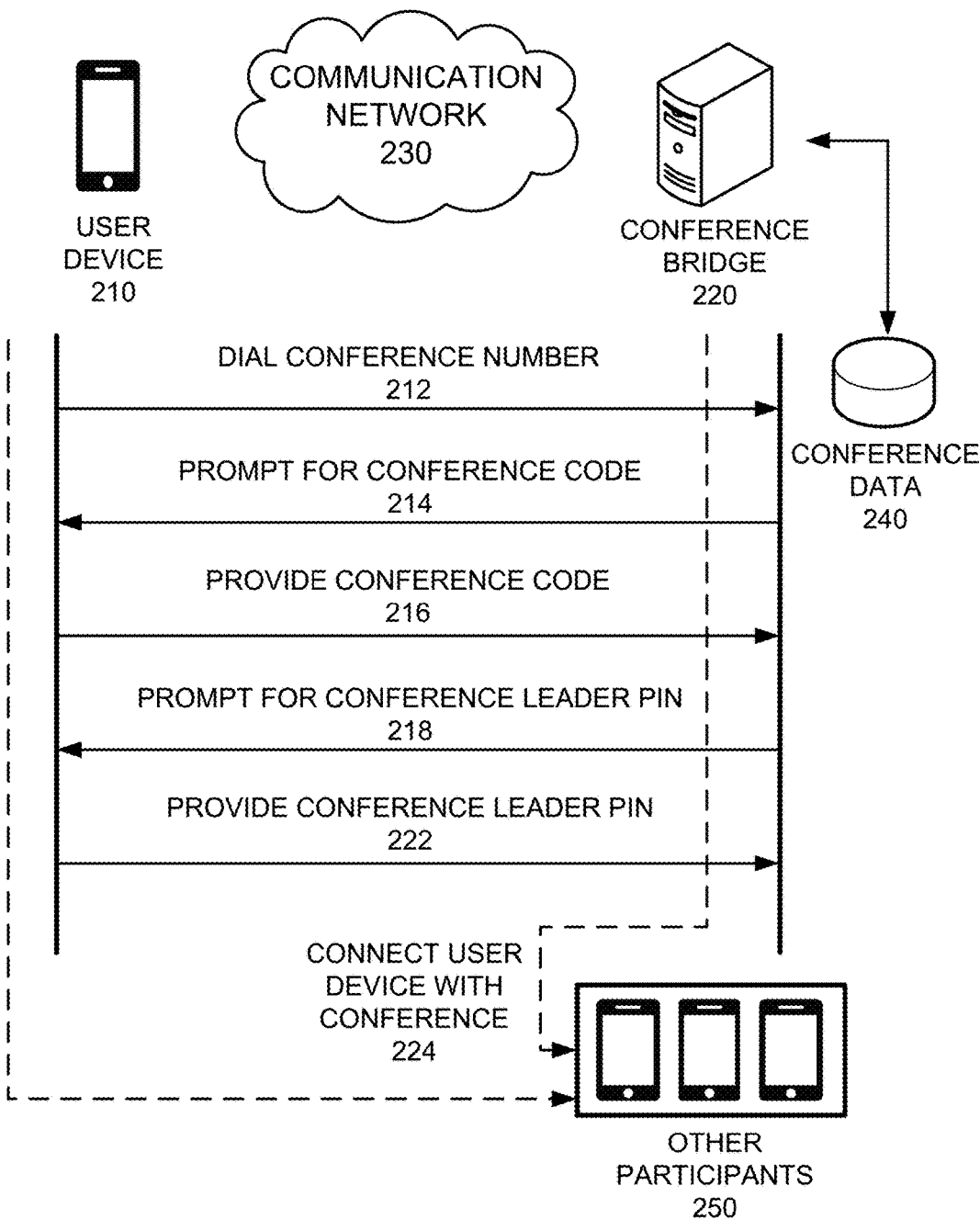
FIG. 1 illustrates an example prior art communication network system example of establishing a conference call.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

According to example embodiments, a user device, such as a smartphone, cellular phone, tablet device, laptop or other computing device with a memory and processor, may communicate with a conference call setup and bridging application managed by a call server or other call management device. The communications performed to setup the conference call, attend the conference call, etc., may be performed through a combination of mediums, such as phone calls, text messages including but not limited to short message service (SMS) messaging, and e-mail. Also, other communication mediums may be used to communicate with the user device and the conference call management server 'conference server' and/or a conference call bridge server 'bridge server'. In one example the interaction between a user device and the server(s) may begin with an inbound voice call/SMS message in this example. It could also be initiated by an outbound call or SMS message. The application may prompt the caller to select a conference, respond to a pending invitation or initiate a new conference procedure. The user information can be collected and stored in a data repository managed by the servers.

Figure 2:
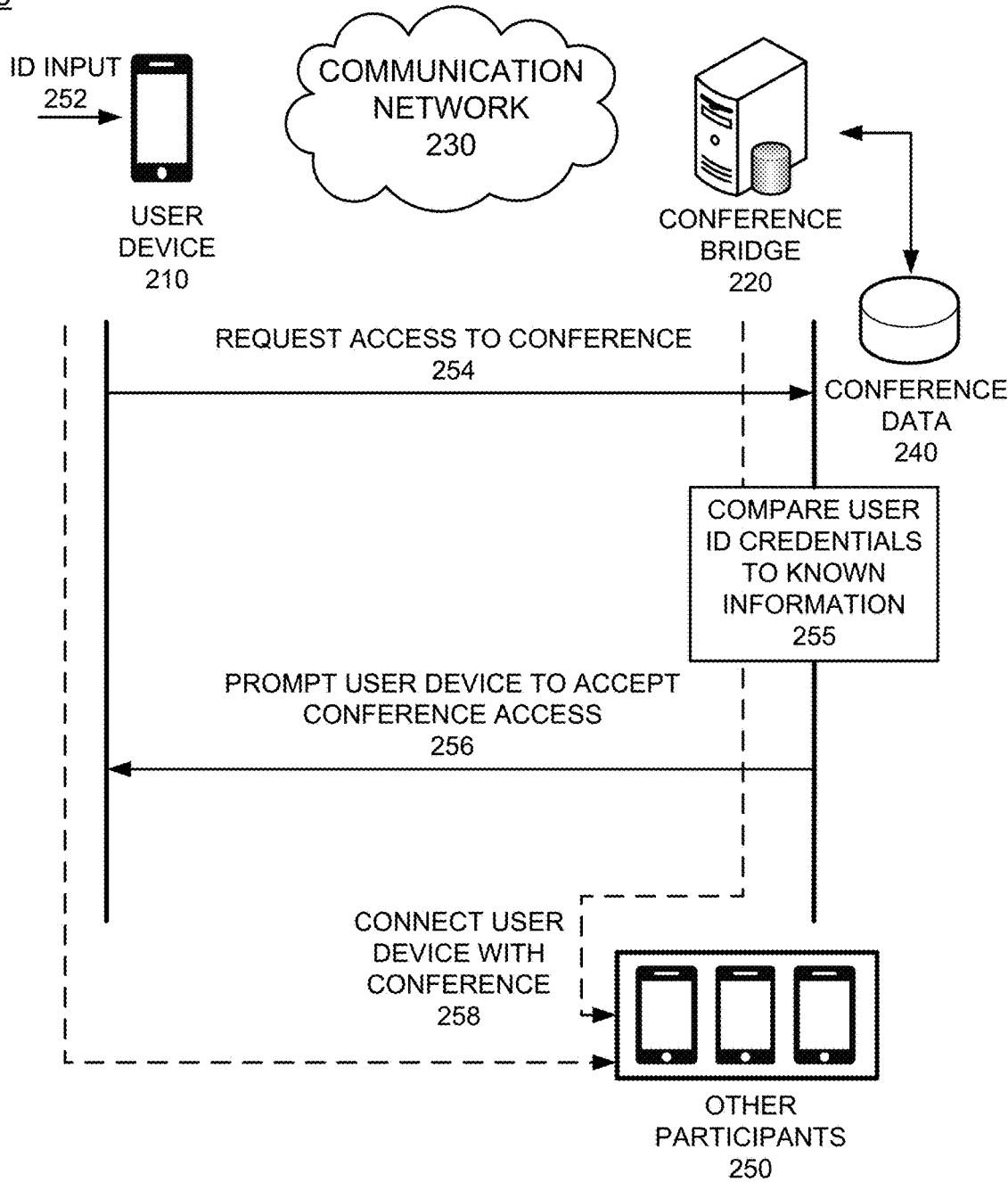
FIG. 2 illustrates an example communication network system of establishing a conference call according to example embodiments.

FIG. 2 illustrates an example conference call system communication example of establishing a conference according to example embodiments. In this example 200, the user device 210 is communicating with either a conference call application installed on the user device 210 and/or is calling a telephone number associated with the conference bridge 220. The call may also be initiated by a short message service (SMS) communication session between the user device 210 and the conference server 220 across the network 230.

In operation, the user device 210 may be scheduled in advance to be called by the conference bridge 220 at the appointed time of a meeting. The user device 210 may submit a message to request access 254 to the conference bridge 220 via a callback option or via direct access without delay. The server 220 may identify the user device 210 and authenticate the user device 210 as an invited member of an existing conference based on known conference data 240 stored in a memory accessible to the server 220. Also, in one example, the user device 210 may be associated with a profile of a leader or initiator attempting to setup and manage/lead the conference, in which case the authentication procedure may be attempting to identify the user device as a registered member of the conference call application.

In one example, a button or menu option may be embedded within a calendar application, such as OUTLOOK or other mail/calendar applications. The user device 210 may call into the conference bridge 220 manually to register via a phone or SMS text messaging. At any time, the conference bridge 200 may store the user device information profile and reference the information to identify and authorize the user device from the conference data 240. Also, the profile may be linked to callback options, including devices to be called, a time to call (e.g., once all other participants have joined, 5 minutes prior, 10 minutes prior, 1 minute prior, once the leader has joined, etc.). Also, other options may include to send a web link to access the conference, dial the user device as a call, initiate the conference application on the device, etc.

Continuing with the same example, the server 220 may require a bridge code passcode from the user device 210. In this example, the user device 110 may provide the bridge code passcode 118 based on a previous SMS message or e-mail. Also, the application may search for the passcode based on a date or other parameter that is linked to the conference call so the user does not have to open a previously received e-mail or find the passcode, as the user may be busy driving or walking, etc. In one specific example, the request for access message 254 includes an identifier (ID) linked to the user device 210 and/or a user profile associated with the conference call application. The request being sent includes the ID which may include a biometric parameter, a QR code or other bar code being scanned by the user device, a RFID tag which is brought into contact with the mobile device and identified by the call application, etc. Any one or more of those parameters may be offered as part of the request to join the conference and received by the conference server 220.

In operation, a user and his or her user device are authorized immediately after the RFID badge and/or the badge QR code/biometrics are validated and recognized. All the conference access parameters, conference code, password, etc. are stored in a database and retrieved to identify the correct conference. All the user and conference details are stored in the database for easy access purposes. The context may be a parameter(s) used to find a relevant conference. The time the user profile is validated/authorized, the conferences that are closest to that point in time and/or the conferences that are related to the user's previous actions and/or the conferences in which the user profile is listed as a participant are all procedures which are used to match the user to the correct conference based on the conference context approach.

The credentials may include a random string of alphanumeric characters that are tied to a user record in a database. This provides that the credentials may be lost and possibly a new set can be generated and tied to the record. This ensures the actual record is not exposed and maintains itself as a secret. When the user logs into a system that verifies their identity, the conference activation is only one of many actions that could be triggered. The context identified may include a set of real-time information that is made available at any particular moment or window in time. So, if one or more segments of information varies with time then the context will be different at each time instance. For example, a context could be a user device position (i.e., GPS location), a speed (i.e., GPS speed indication), direction of motion (i.e., GPS location changes), rate of acceleration or deceleration (i.e., GPS location information), time of day, temperature, season, date, etc. The application that identifies a user device context may use the context information when making decisions regarding the user profile and certain events. For example, an automobile that has a context aware antilock braking system (ABS) would be able to activate the ABS system based on weather using temperature, season, date (month and day of year), position, speed, direction and rate of acceleration. Without context awareness the ABS would be always enabled providing less efficiency. In one example, the context information may be a cross-referenced information sample that is used to provide additional security once the ID credentials have been established, for example, if the user was expected to be at a particular location at a particular time, then that could be used as a recorded context used to further authorize the user device and the user profile matching the user device.

In one example of joining a conference, a person/user profile is required to activate the conference (i.e., leader) and one or more profiles may then join the created conference (i.e., participants). To create a conference, a conference code and a leader PIN are required. To join as a participant, only the conference code is required. The identified contextual information for a join event may include identifying the conference code and time of the conference because the conference code can be reused at different times of the day. After the user is validated, the conference is identified by the contextual information, such as a new conference starting close to a current time, whether the participant was included in the conference, whether the participant is a leader etc., all such information can be used to dictate how the conference was setup. If the participant is the leader, the leader PIN is retrieved and a conference is created and the participants are entered into the conference.

Once the request is received by the conference server 220, the ID information is cross-referenced with known ID information linked to the user profile/user device 210. The information may be stored in the conference data 240 and referenced as needed. The referenced data may then be compared to the received user ID information 255 by the conference server 220. The result of the comparison may yield a prompt being sent to the user device 256 that the conference is available and the user may access the conference at any time, or that the conference access is being processed automatically and the user device is being linked to the conference 258. The other participants 250 may already be participating in the conference.

In the case of a SMS communication session, the server 220 may validate the account information and access the scheduled conference call to link the user profile to the actual conference data. The server 220 may then prompt the user device via another SMS message to submit any date, time, and/or other preferences associated with a callback option, if desired. The user device 210 may then provide the message with callback information, and receive a confirmation of the completed task of establishing the callback. All such information related to the interaction may then be sent to the conference bridge server 220 for updating the user profile. At a later time, the conference bridge 220 may then identify the current callback time has matured. The conference bridge 220 may initiate a call or link to the user device 210 at the specified time. The user device 210 may submit a response and is then joined to the conference bridge 220.

Figure 3:
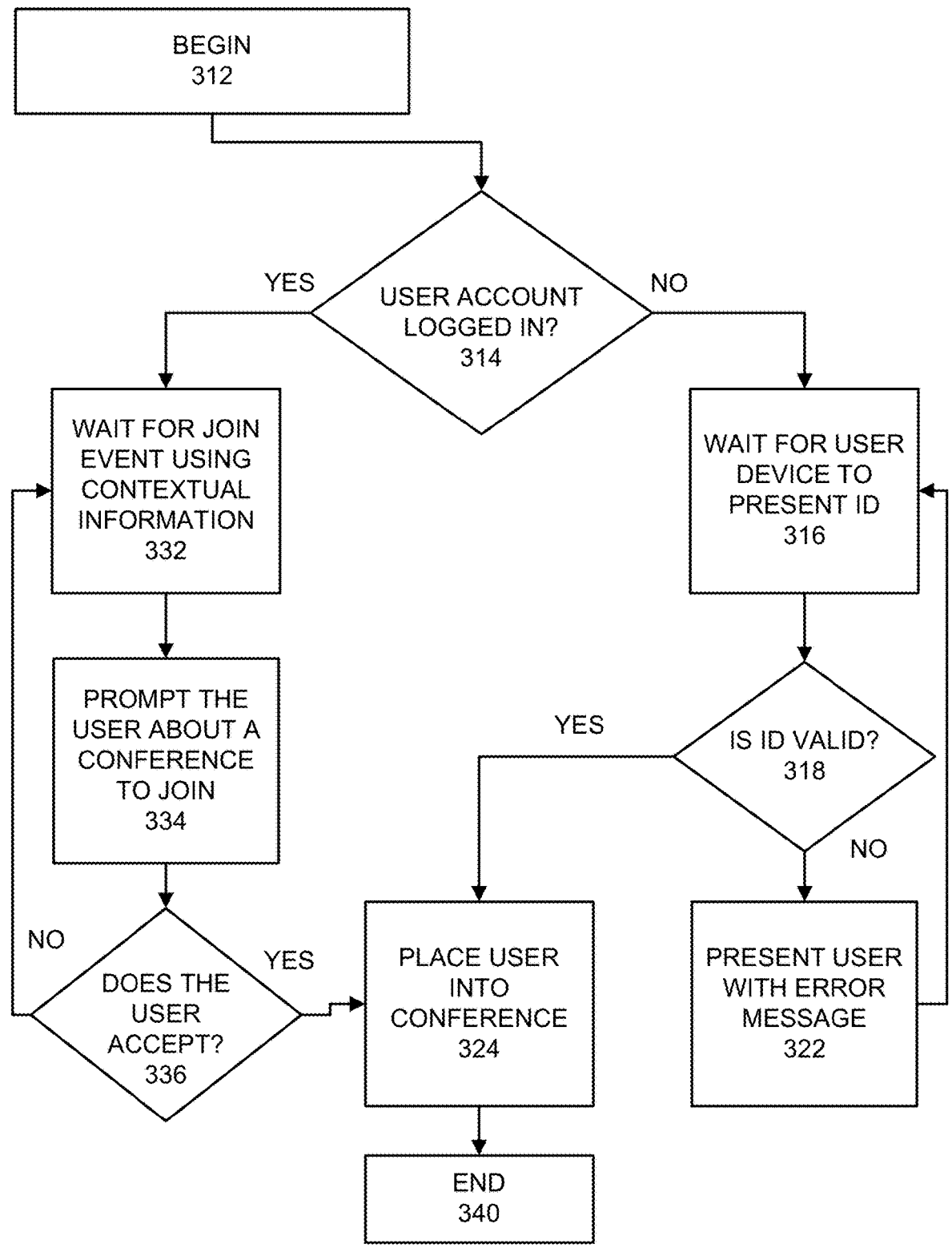
FIG. 3 illustrates a flow diagram procedure for accessing a conference call via a user device according to example embodiments.

FIG. 3 illustrates a flow diagram procedure for accessing a conference call via a user device according to example embodiments. Referring to FIG. 3, the flow diagram 300 includes a begin operation 312 which may include an access attempt, request or other conference setup operation. The first logical operation decision may be to determine whether the user account is currently logged-in 314 to an account service affiliated with the conference call. If not, then a wait operation may be performed 316 and a determination as to whether the ID is valid 318 may also be performed. If no, then the response may be an end or error operation. If so, the user is placed into the conference 324 automatically. In the alternative scenario, if the user account is logged-in, then a join event may occur based on contextual information 332. The user is prompted to join the conference automatically 334 and the user accepts 336 and is placed in the conference and the process ends 340. If the user does not accept, the conference is not initiated for the user.

Figure 4:
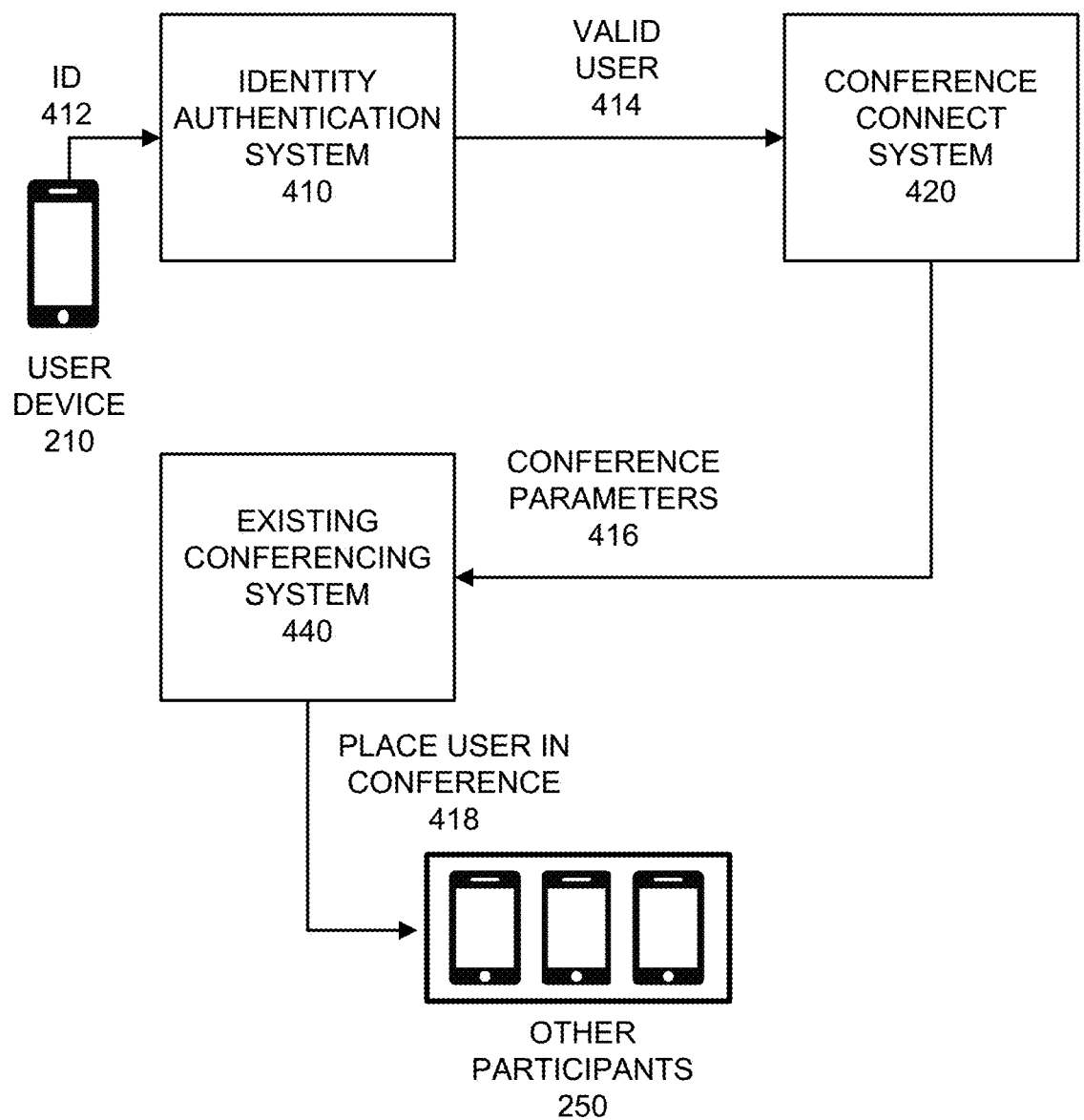
FIG. 4 illustrates a logic diagram for processing a conference call establishing procedure according to example embodiments.

FIG. 4 illustrates a logic diagram for processing a conference call establishing procedure according to example embodiments. Referring to FIG. 4, the configuration 400 provides a user device 210 providing ID information 412 to an authentication system module 410 which works with a conference connect system 420. Both modules may represent software only, hardware only or a combination of both, and may be disposed in a single computing device or multiple computing devices configured to manage the conference authorization, access and connection operations. The identity authentication system 410 may be responsible for identifying a user device ID and determining whether the ID has or is associated with the credentials required to access the conference call. The authorization process may yield a valid user 414 or an invalid user being identified. When the user is valid, the conference connection system 420 may then forward the user device information and/or conference parameters 416 to the existing conference system 440, which may include a server, bridge, etc. The user device will then be automatically connected 418 to the conference with the other participants 250.

The identity authentication system (IAS) 410 operates in two modes. One mode is public mode, which verifies the identity of the leader/participant in real-time using QR codes, RFID tags and/or biometric recognition operations based on biometrics, such as fingerprint, voice, eye identification, facial identification, health diagnostics, secret information, etc. The public mode is used for devices shared by various users such as outside conference rooms. In private mode, a user is required to log in to the device. In this example, the login operation verifies the identity of the authorized user, and is used for private devices, such as cell phones and computers. When there is a conference that is active that requires the user to participate or initiate entry into the conference, the user will be prompted and all that is required is an acceptance, assuming the ID qualifications have been satisfied.

This approach negates any need to type login name information, password information, and/or the conference code/PIN on a phone keypad prior to being moved into the conference. Once the ID information is validated, the corresponding stored conference code, leader PIN and other information will be retrieved from memory and passed to the conference connect system (CCS) 420. The entire application is context-aware, and thus context information, such as a phone number to use (e.g., conference room phone number, mobile phone number), time of day, conference information, if pre-scheduled, etc., will all be retrieved from memory and applied to the credential validation procedure of the IAS 410. The CCS puts the pieces together and places a call when validation is identified. All the leader or participant needs to do is join the conference that has already been created.

Figure 5:
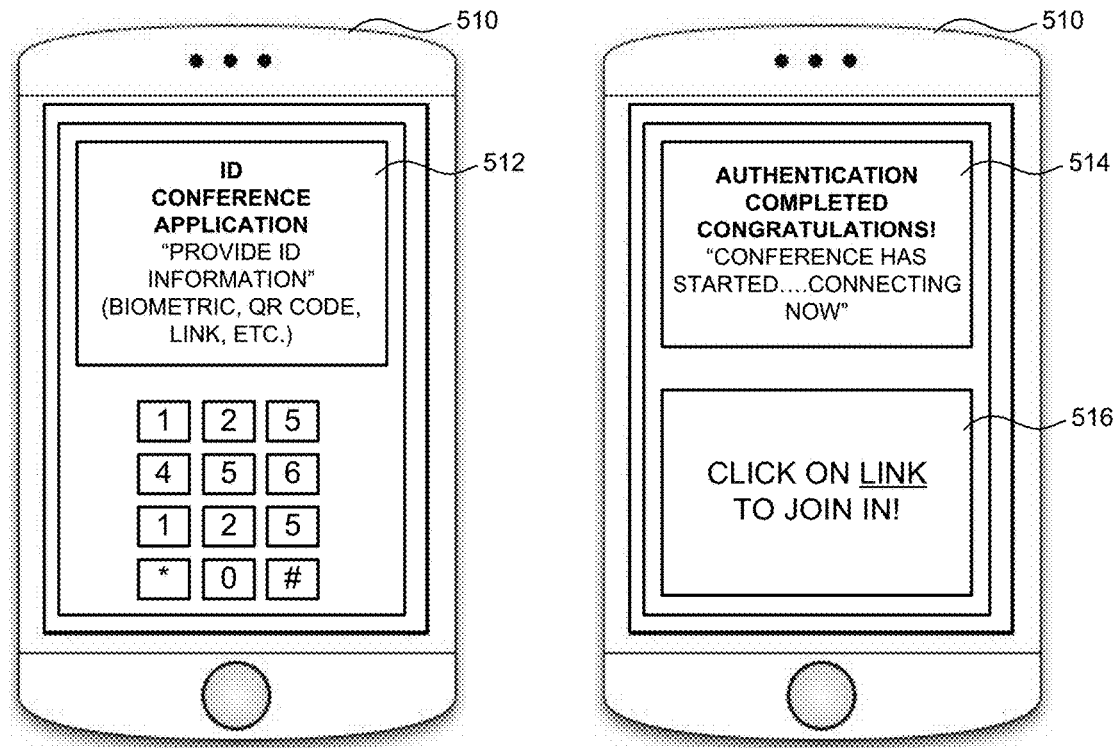
FIG. 5 illustrates a user interface configured to provide conference access options to a user device according to example embodiments.

FIG. 5 illustrates a user interface configured to provide conference access options to a user device according to example embodiments. Referring to FIG. 5, the user interface examples 500 include a user device 510 with a first interface 512 having information pertaining to the access features. Once selected, the next screen demonstrates that the authentication is completed 514 and that a link may be selected 516 to access the conference which has already been authorized. Other variations of the user interface for accessing the conference may be used and may be readily apparent to one skilled in the art.

Figure 6:
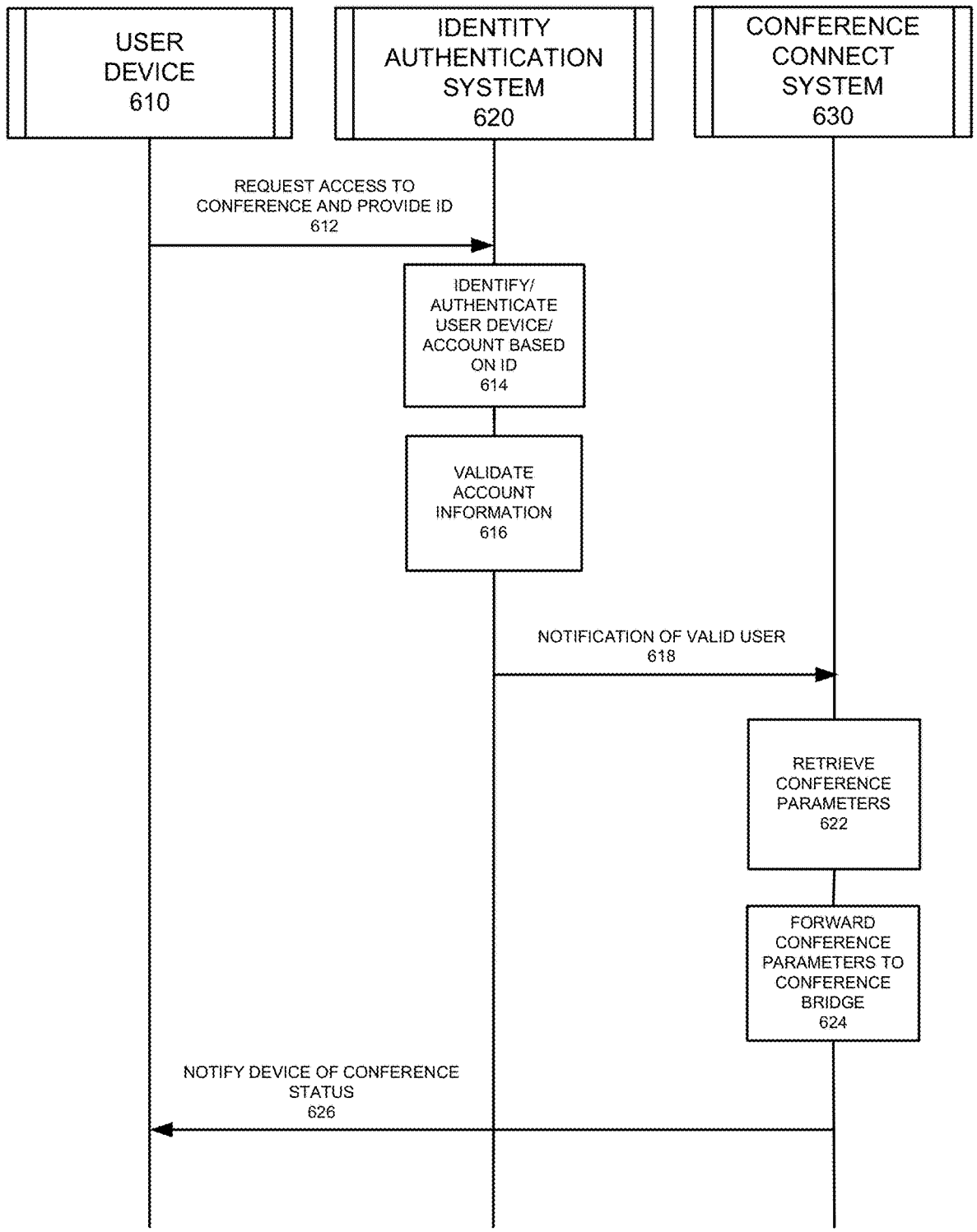
FIG. 6 illustrates a system signaling diagram for providing access to a conference according to example embodiments.

FIG. 6 illustrates a system signaling diagram for providing access to a conference according to example embodiments. Referring to FIG. 6, the system 600 provides a user device which is seeking access to the conference via interactions with the identity authentication module 620 and the conference connect module 630. The process provides requesting access to the conference and providing an ID 612. The process also includes identifying and authenticating the user device based on the ID provided 614 and any device specific information. The authentication system 620 will validate the account information 616 against any known information stored about the user device profile and the conference. The validation results in a message being forwarded to the CCS 630 identifying the user as valid 618. The validation invokes a conference parameter retrieval operation which includes the conference passcode and other access information necessary to place the user device into the active conference. The conference parameters may be forwarded to the conference bridge 624 and the user device may be notified 626 to access the conference.

One example method of operation may include receiving a conference call access request message from a user device, identifying an identifier included in the access request message associated with the user device, comparing content of the identifier to known identifier information, determining whether to authorize the access request, and responsive to authorizing the access request, transmitting a conference access prompt to the user device to access the conference call. The user may be moved to a conference once the ID information is received. Also, context information may be used to ensure the conference is accurately aligned for that particular user device and corresponding profile. The identifier includes one or more of a biometric data sample, near field antenna data, and code scan data. The method may also include authorizing the access request when the identifier matches the known identifier information. The method may also include identifying the user device, and determining one or more contexts associated with the user device responsive to identifying the user device. The method may further include identifying one or more active conferences based on the one or more contexts, and automatically placing a user profile associated with the user device in the one or more active conferences. The method may also include comparing the one or more contexts associated with the user device to one or more predefined data contexts, and when the one or more contexts match the one or more predefined data contexts, then authorizing the user device to enter the conference call. The one or more contexts include one or more of a current location, a current traveling speed, and a current temperature, and the one or more predefined data contexts comprise threshold values which match the one or more contexts when a deviation between the one or more contexts and the one or more predefined data contexts is less than a threshold deviation value. For example, if the person is expected to be at a location that is typically 70 degrees and the context information identifies 65 degrees, then the threshold deviation value may be acceptable since it is not over a 10 percent threshold deviation value.

Figure 7:
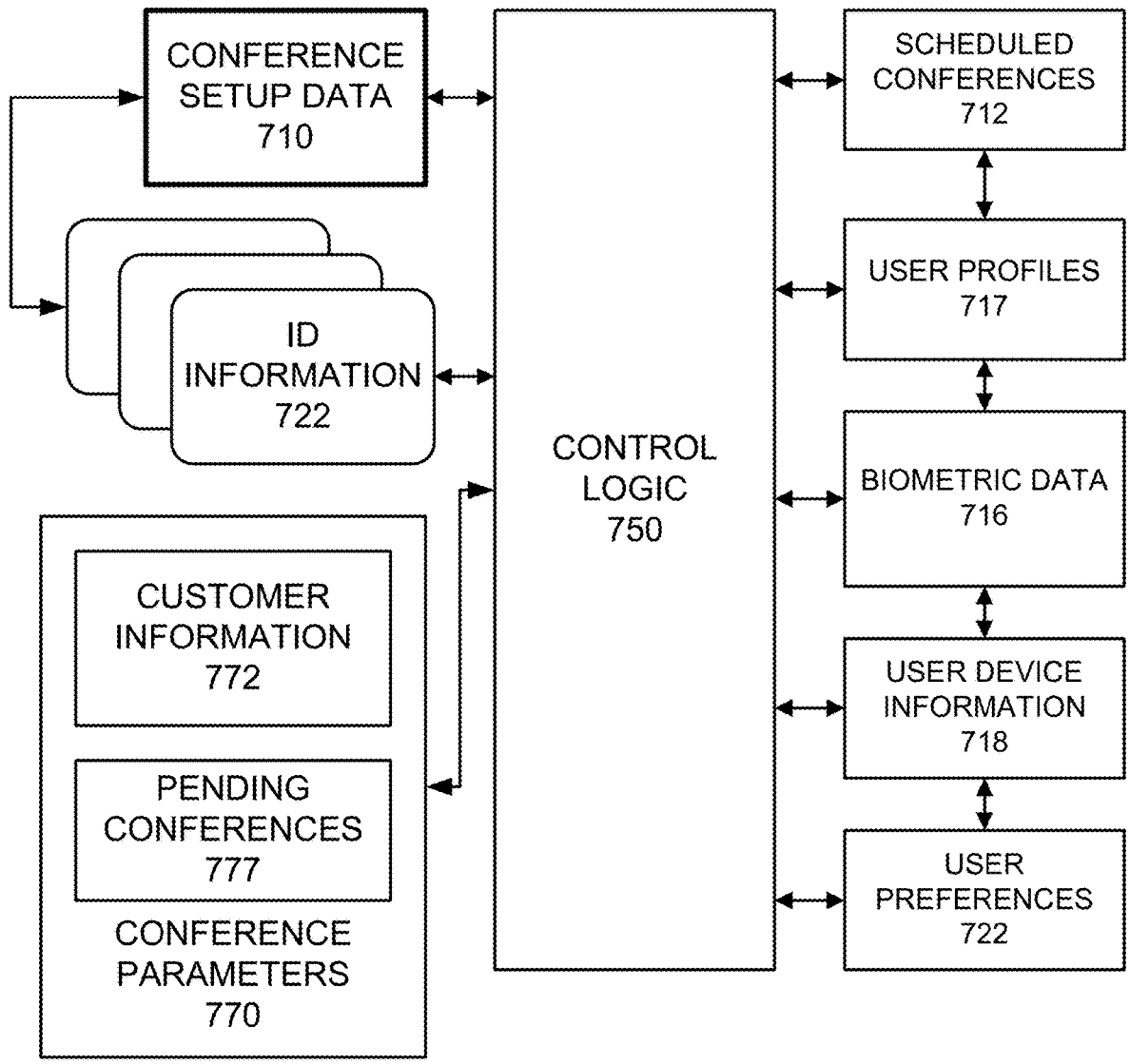
FIG. 7 illustrates a logic diagram with the input and output data managed by a controller to provide conference access to a user device according to example embodiments.

FIG. 7 illustrates a logic diagram 700 with the input and output data managed by a controller to provide conference access to a user device according to example embodiments. Referring to FIG. 7, the logic controller 750 may receive various input parameters, such as conference setup data 710 for conference creation, ID information of the intended participant(s) 722, and may reference certain conference parameters 770 including customer information 772 and pending conference information 777. The information necessary to engage a conference with a user device may include the scheduled conference 712, the user profiles 717 allowed to participate, biometric data 716 necessary for validation of the user device and profile, user device information 718, which may be specific to the user device hardware and/or software, and user preferences 722 for participating in the conference.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example network element 800, which may represent any of the above-described network components of the other figures.

Figure 8:
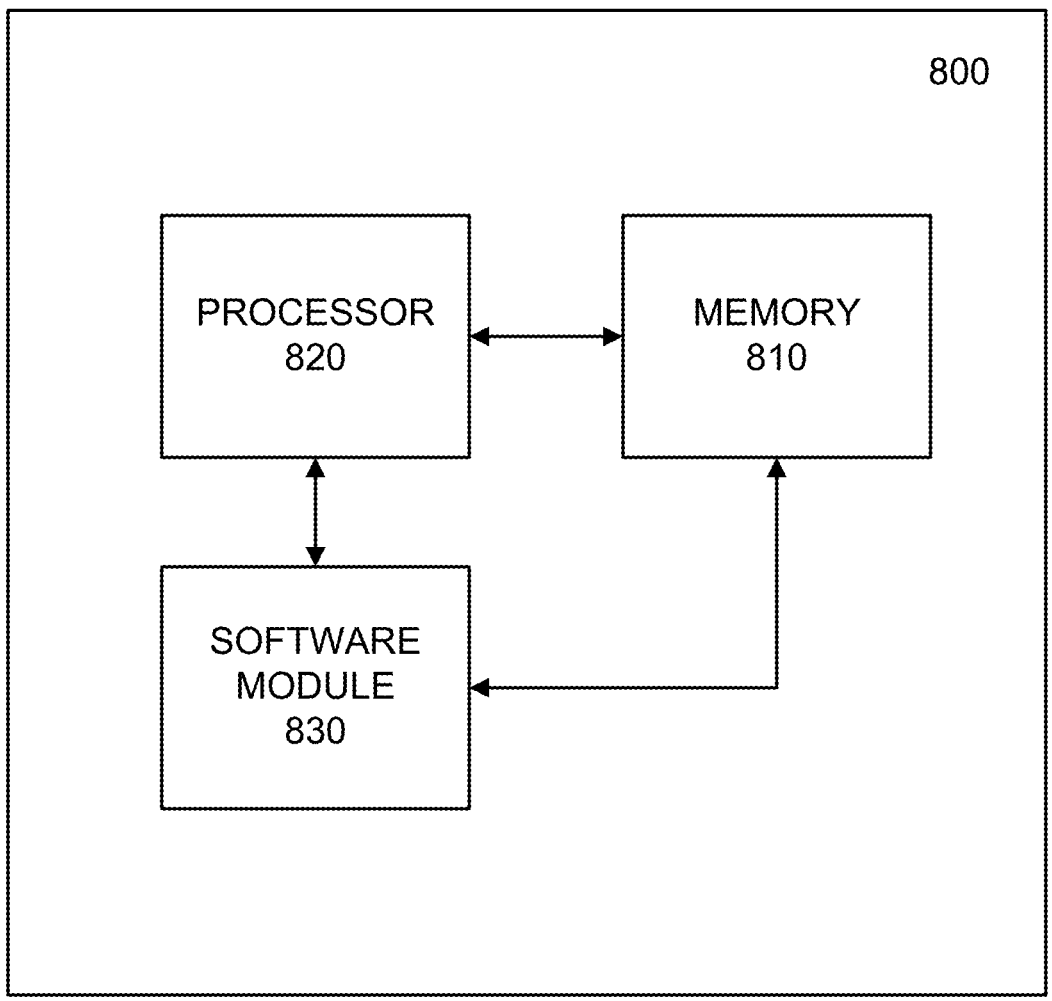
FIG. 8 illustrates an example network entity device configured to store instructions, software, and corresponding hardware for executing the same, according to example embodiments of the present application.

As illustrated in FIG. 8, a memory 810 and a processor 820 may be discrete components of the network entity 800 that are used to execute an application or set of operations. The application may be coded in software in a computer language understood by the processor 820, and stored in a computer readable medium, such as, the memory 810. The computer readable medium may be a non-transitory computer readable medium that includes tangible hardware components in addition to software stored in memory. Furthermore, a software module 830 may be another discrete entity that is part of the network entity 800, and which contains software instructions that may be executed by the processor 820. In addition to the above noted components of the network entity 800, the network entity 800 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   receiving a message for conference call access to be provided to a user device;
   identifying an identifier associated with the user device based on the message;
   comparing content of the identifier to known identifier information;
   determining to authorize access to the conference call based on at least a matching result of the comparison; and
   automatically transmitting a conference access prompt to the user device corresponding to access the conference call based on at least the matching result of the comparison.

2. The method of claim 1, wherein the identifier comprises one or more of a biometric data sample, near field antenna data, and code scan data.

3. The method of claim 1, further comprising:
   identifying the user device; and
   determining one or more contexts associated with the user device responsive to identifying the user device.

4. The method of claim 3, further comprising:
   identifying one or more active conferences based on the one or more contexts; and
   automatically placing a user profile associated with the user device in the one or more active conferences.

5. The method of claim 3, further comprising:
   comparing the one or more contexts associated with the user device to one or more predefined data contexts; and
   when the one or more contexts match the one or more predefined data contexts, then authorizing the user device to enter the conference call.

6. The method of claim 1, wherein the one or more contexts comprise one or more of a current location, a current traveling speed, and a current temperature, and the one or more predefined data contexts comprise threshold values which match the one or more contexts when a deviation between the one or more contexts and the one or more predefined data contexts is less than a threshold deviation value.

7. An apparatus, comprising:
   a receiver configured to receive a message for conference call access to be provided to a user device;
   a processor configured to
     identify an identifier associated with the user device based on the message;
     compare content of the identifier to known identifier information;
     determine to authorize access to the conference call based on at least a matching result of the comparison; and a transmitter configured to automatically transmit a conference access prompt to the user device corresponding to access the conference call based on at least the matching result of the comparison.

8. The apparatus of claim 7, wherein the identifier comprises one or more of a biometric data sample, near field antenna data, and code scan data.

9. The apparatus of claim 7, wherein the processor is further configured to identify the user device, and determine one or more contexts associated with the user device responsive to identification of the user device.

10. The apparatus of claim 9, wherein the processor is further configured to identify one or more active conferences based on the one or more contexts; and automatically place a user profile associated with the user device in the one or more active conferences.

11. The apparatus of claim 9, wherein the processor is further configured to compare the one or more contexts associated with the user device to one or more predefined data contexts; and when the one or more contexts match the one or more predefined data contexts, then authorize the user device to enter the conference call.

12. The apparatus of claim 7, wherein the one or more contexts comprise one or more of a current location, a current traveling speed, and a current temperature, and the one or more predefined data contexts comprise threshold values which match the one or more contexts when a deviation between the one or more contexts and the one or more predefined data contexts is less than a threshold deviation value.

13. The method of claim 1, wherein the conference access prompt includes information indicating that the user device is automatically being joined to a conference corresponding to the conference call.

14. The method of claim 1, wherein the conference access prompt includes information indicating that the conference call is currently available to be joined.

15. The method of claim 1, wherein the conference access prompt requests receipt from the user device of information relating to the conference call, the information indicating one or more options for the conference call.

16. The method of claim 15, wherein the one or more options include one or more conditions for automatically initiating transmission of a communication to join the user device to the conference call, the transmission to be automatically initiated after transmitting the conference access prompt to the user device.

17. The method of claim 16, wherein the one or more conditions include at least one of a future time or future date of the conference call.

18. The method of claim 16, wherein the communication is a callback to the user device.

19. The method of claim 16, wherein the communication is a message back to the user device and wherein the message is one of a text message or an email message.

20. The method of claim 19, wherein the message includes a link to allow the user device to join the conference call when activated on the user device.

21. The method of claim 1, further comprising:
accessing information from a user profile indicating one or more options specified for allowing access of the user device to the conference call;
determining whether the one or more options have been satisfied; and
automatically transmitting a communication to the user device when the one or more options are satisfied.

22. The method of claim 21, wherein the information is received for storage in the user profile in response to the conference access prompt.

23. The method of claim 21, wherein the communication is to allow the user device to join a conference call corresponding to the conference access prompt previously transmitted to the user device.

24. The method of claim 23, wherein:
the communication is a callback, and
the one or more options include one or more conditions for automatically initiating the callback.

25. The method of claim 23, wherein:
the communication is a message,
the one or more options include one or more conditions for automatically initiating transmission of the message, and
the message includes a link to allow the user device to join the conference call.

26. The method of claim 25, wherein the message is a text message or an email message.

27. A non-transitory computer readable storage medium configured to store instructions that when executed cause a processor to perform:
receiving a message for conference call access to be provided to a user device;
identifying an identifier associated with the user device based on the message;
comparing content of the identifier to known identifier information;
determining to authorize access to the conference call based on at least a matching result of the comparison; and
automatically transmitting a conference access prompt to the user device corresponding to access the conference call based on at least the matching result of the comparison.

28. The non-transitory computer readable storage medium of claim 27, wherein the identifier comprises one or more of a biometric data sample, near field antenna data, and code scan data.

29. The non-transitory computer readable storage medium of claim 27, wherein the processor is further configured to perform:
identifying the user device; and
determining one or more contexts associated with the user device responsive to identifying the user device.

30. The non-transitory computer readable storage medium of claim 29, wherein the processor is further configured to perform:
identifying one or more active conferences based on the one or more contexts; and
automatically placing a user profile associated with the user device in the one or more active conferences.

31. The non-transitory computer readable storage medium of claim 29, wherein the processor is further configured to perform:
comparing the one or more contexts associated with the user device to one or more predefined data contexts; and
when the one or more contexts match the one or more predefined data contexts, then authorizing the user device to enter the conference call, and
wherein the one or more contexts comprise one or more of a current location, a current traveling speed, and a current temperature, and the one or more predefined data contexts comprise threshold values which match the one or more contexts when a deviation between the one or more contexts and the one or more predefined data contexts is less than a threshold deviation value.

* * * * *